July 7, 1931.                J. M. AUFIERO                1,812,918
                            WINDSHIELD WIPER
                           Filed Feb. 12, 1929
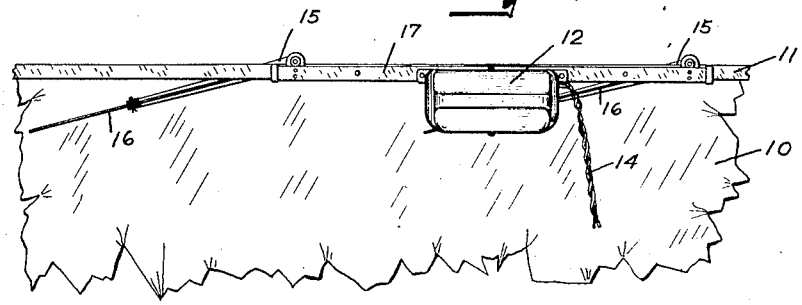
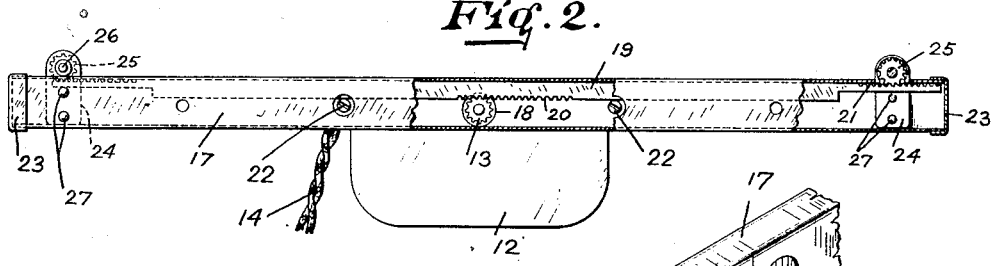
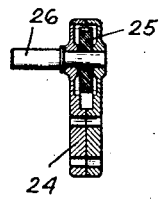
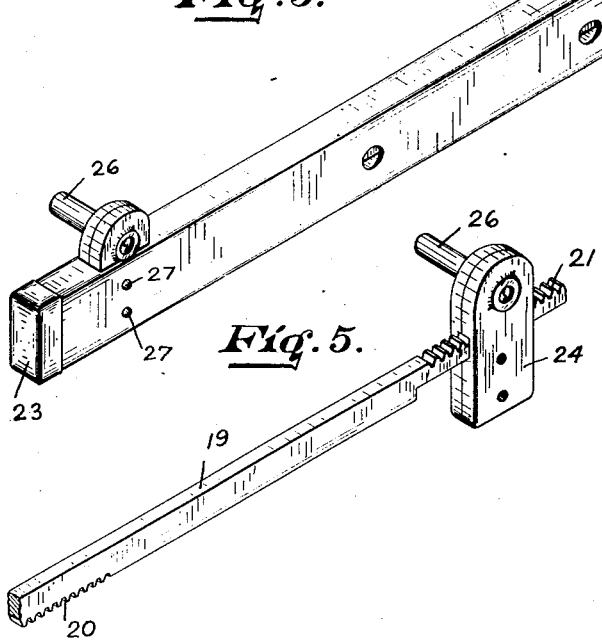
INVENTOR.
John M. Aufiero
BY Duell, Dunn & Anderson
ATTORNEYS.

Patented July 7, 1931

1,812,918

UNITED STATES PATENT OFFICE

JOHN M. AUFIERO, OF BROOKLYN, NEW YORK, ASSIGNOR TO E. A. LABORATORIES, INC., OF BROOKLYN, NEW YORK, A CORPORATION OF NEW YORK

WINDSHIELD WIPER

Application filed February 12, 1929. Serial No. 339,366.

This invention relates to an operating mechanism capable of use in numerous different associations but particularly to be employed in connection with wipers such as are utilized in association with the windshields of automotive and other vehicles.

It is an object of the invention to provide a device of this character, the parts of which will be relatively few in number and individually simple and rugged in construction, these parts being capable of ready assemblage to provide a compact unitary structure capable of being sold at a nominal figure and operating over long periods of time with freedom from mechanical difficulties.

A further object of the invention is that of providing a wiper mechanism which will efficiently cause a wiper blade or blades to traverse the surface of a windshield and which moreover will occupy a minimum amount of space so that it will not present an objectionable appearance nor will it interfere with "full range" vision.

Another object is that of providing a mechanism of this type which may be readily applied to the parts with which it is to be associated and which, in such association, will present a compact structure, the several parts of which will remain in operative association for an indefinite period of time.

With these and further objects in mind, reference is had to the attached sheet of drawings illustrating one practical embodiment of the invention, and in which:

Fig. 1 shows the mechanism operatively associated with a driving motor and wiper blades;

Fig. 2 is a rear view of such mechanism, certain of the parts being broken away to disclose underlying construction;

Fig. 3 is a perspective view of one end of the mechanism;

Fig. 4 is a transverse sectional view thereof; and

Fig. 5 illustrates a portion of this mechanism with the casing removed.

In these views, the numeral 10 indicates a surface to be cleaned such as a windshield and which is provided with the usual frame or beading 11 for mounting the same. Secured to a casing—hereinafter described—which is carried by this frame, is a motor casing 12 from which a pinion or other suitable driving element 13 extends and if this motor be of the electrical type, leads 14 are provided which are connected with a suitable source of electrical current and the motor within the casing 12. These parts in the embodiment shown all extend to one side of the frame 11 and, upon the opposite side thereof, operating arms 15 are provided which mount squegee or wiper blades 16, the latter being of any desired construction and the arms 15 being intended to be oscillated.

The casing for the mechanism which serves to transmit the driving force of the motor to the blades is identified as at 17 and comprises in the embodiment shown a housing rectangular in cross section and having a centrally disposed opening 18 in one of its side walls for the passage of the pinion 13. Slidably mounted within this casing is an operating bar 19 which may have a rack portion 20 centrally of its body and rack portions 21 adjacent the ends thereof. In the embodiment illustrated, these portions are formed in opposite edges of the bar but it will be understood that this, while preferably the case, is not necessarily so. The upper edge of the bar under this arrangement of the parts will have sliding bearing within the inner casing face and the lower edge of this bar will have corresponding contact with the bodies of screws 22 extending through the casing and serving to secure the latter to the motor casing and/or to the frame 11. Moreover, the operating bar will be supported centrally by contact with the pinion 13 and its ends will additionally be supported as hereinafter described.

The upper edge of the casing is formed with slots and the ends of the casing are closed conveniently by caps 23. It is obvious that the entire casing may be filled with a proper lubricant in order to reduce friction and consequent wear to a minimum and disposed within the slots afore referred to are units including in the present embodiment two complementary portions 24. The lower parts of these elements may be solid but the upper portions thereof are recessed to accommodate a pinion 25 secured to a shaft 26, and below this pinion there is space sufficient to in each instance accommodate one of the reduced end portions of the bar 19 which is thus slidably supported with the rack part thereof in engagement with the teeth of the pinion. The parts of the units are held in assembled relationship preferably by rivets or bolts 27 passing through openings provided for this purpose in the casing 17 and passing through bores in the portions 24. Thus, a rigid guide for the end of the rack bar is provided, the portions of the units are held together and the entire unit is held against displacement from within the casing. The upper portion of each unit, as shown, preferably extends above the upper edge of the casing and the arms 15 are attached to the shafts 26.

The operation of the mechanism will be obvious in that the pinion 13 or other operating element employed will serve to reciprocate the bar 19 and this bar will oscillate the arms 15 in order to produce the results desired.

Thus, among others, the several objects of the invention, afore-noted are achieved. It is obvious that numerous changes in construction and rearrangement of the parts might be resorted to without departing from the spirit of the invention as defined by the claims.

Having described my invention, what I claim as new and desire to secure by Letters Patent, is:

1. A wiper operating mechanism including a casing formed with openings, a bar having a rack portion in its lower edge, its upper edge being in sliding contact with the inner face of the casing, openings within said casing and below the lower edge of said bar, an operating mechanism extending through one of said openings, securing elements extending through others of said openings and said mechanism and elements engaging the lower edge of said bar to slidably support the same.

2. A wiper operating mechanism including a casing formed with slots in its upper edge, wiper operating units extending within said casing and through said slots, a rack bar having teeth in its upper edge and adjacent its ends to actuate said units and having teeth in its lower edge, and an operating pinion in engagement with said latter teeth and maintaining the upper edge of said bar in engagement with said casing.

3. A wiper operating mechanism including, in combination, a casing formed with an opening, a unit extending through said opening and comprising a pair of complementary sections having recesses in their inner faces, a shaft extending across said recesses and having a wiper arm secured to it at a point beyond said casing, a pinion secured to said shaft within said unit, a bar disposed within said casing, means for reciprocating said bar, a reduced end portion forming a part of said bar and presenting a series of teeth to engage the teeth of said pinion, and said end portion extending into said recesses and supported by the portions of said sections below said pinion to prevent displacement of said bar with respect to said casing.

In testimony whereof I affix my signature.

JOHN M. AUFIERO.